G. E. HALLENBECK.
MULTIPLE SPEED MACHINE TOOL.
APPLICATION FILED DEC. 8, 1913.
1,240,136.
Patented Sept. 11, 1917.
3 SHEETS—SHEET 3.
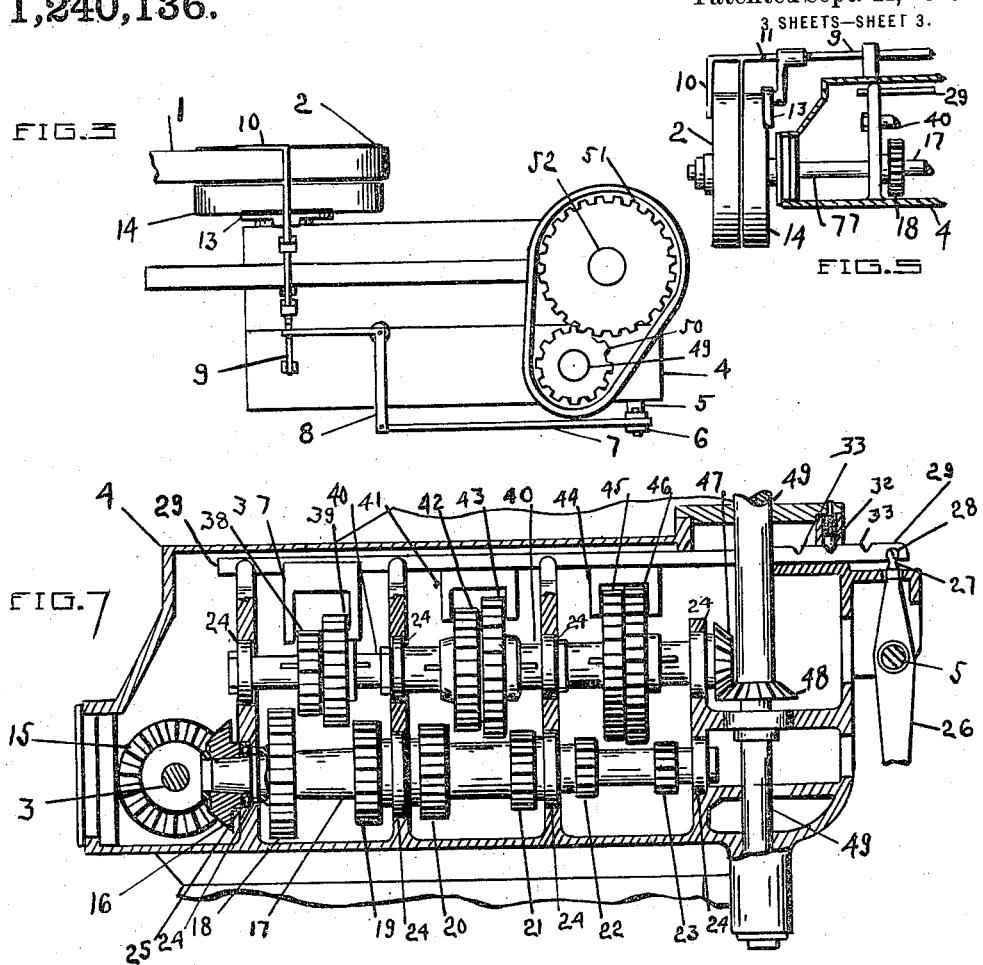
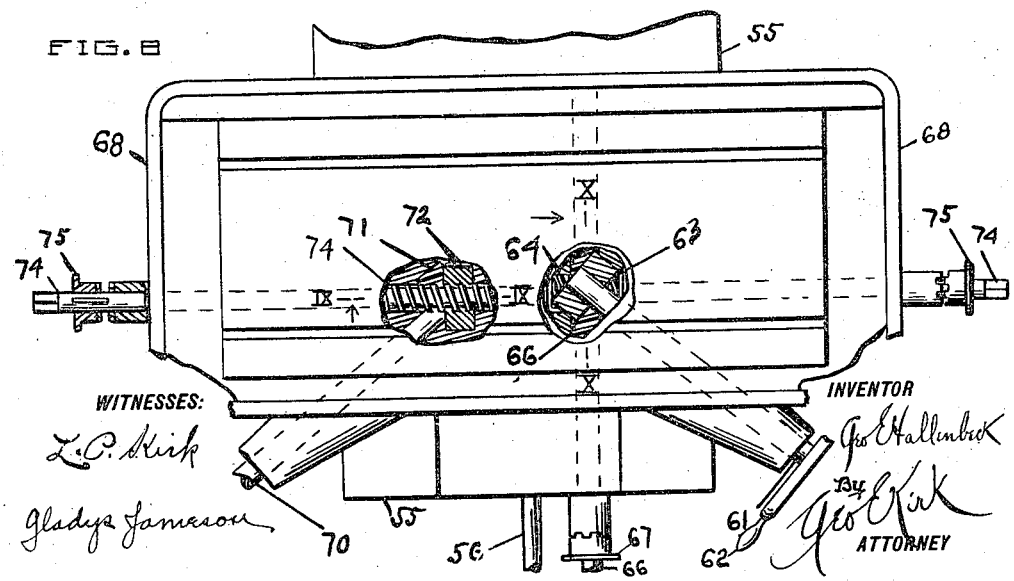

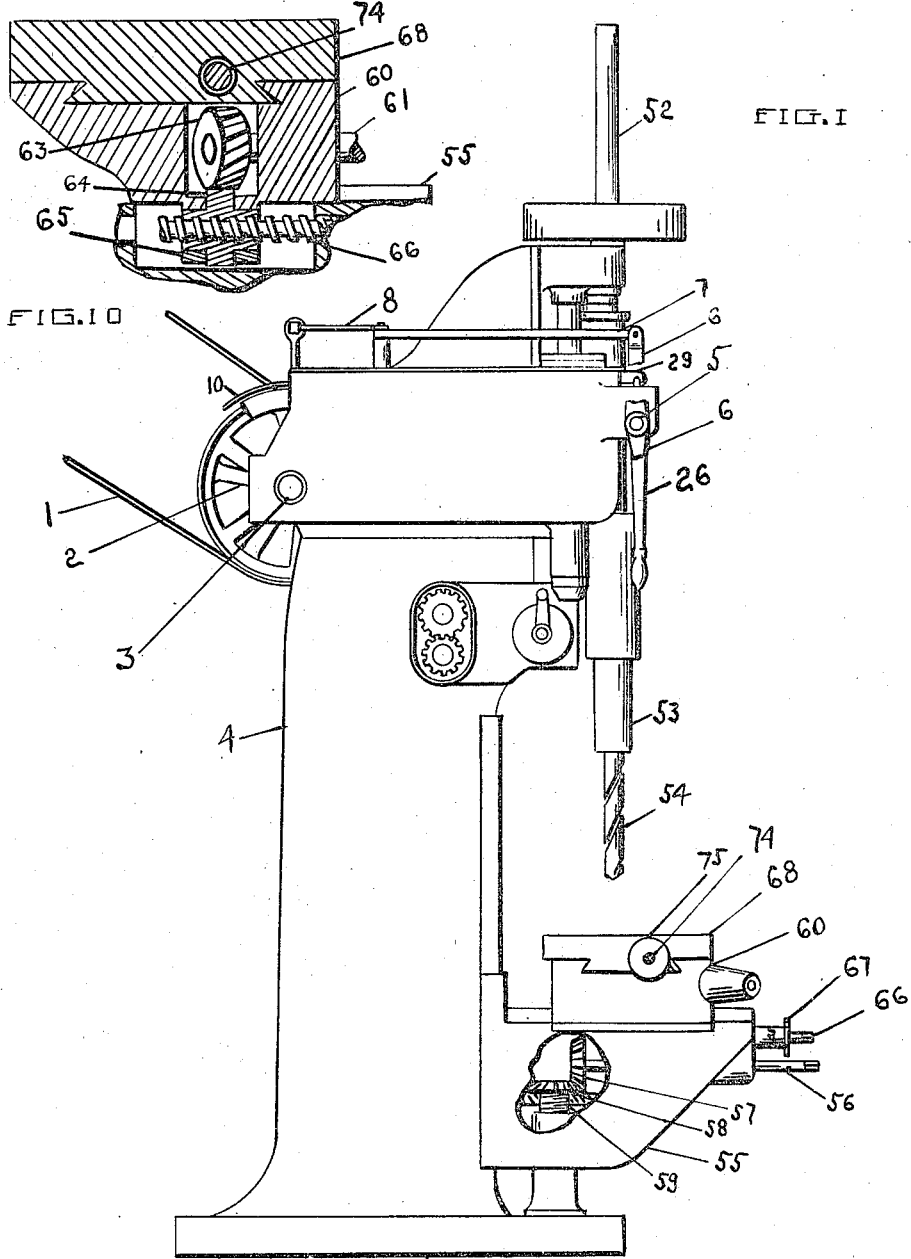

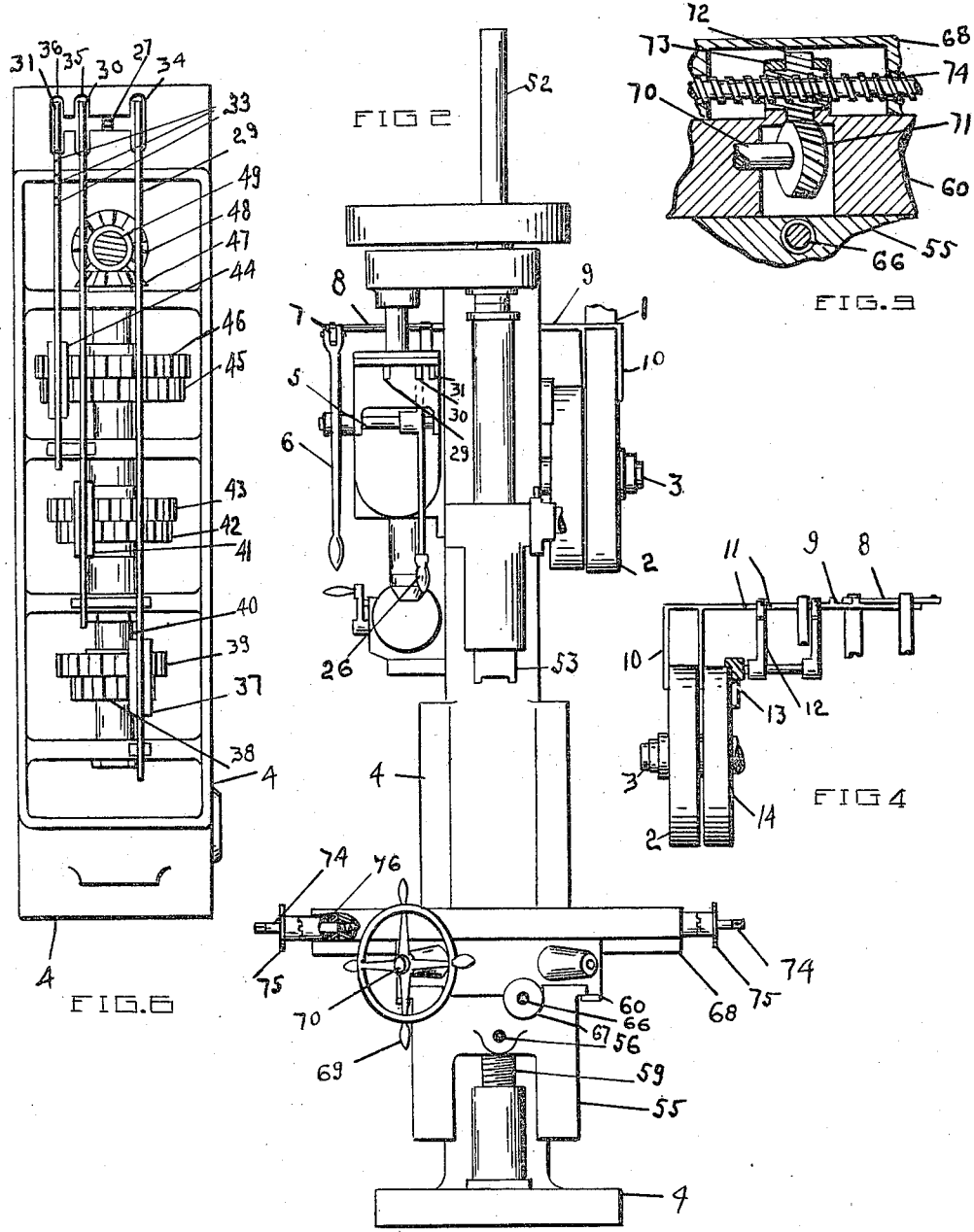

UNITED STATES PATENT OFFICE.

GEORGE E. HALLENBECK, OF TOLEDO, OHIO, ASSIGNOR TO BAKER BROTHERS, OF TOLEDO, OHIO, A FIRM.

MULTIPLE-SPEED MACHINE-TOOL.

1,240,136. Specification of Letters Patent. Patented Sept. 11, 1917.

Application filed December 8, 1913. Serial No. 805,292.

*To all whom it may concern:*

Be it known that I, GEORGE E. HALLENBECK, a citizen of the United States, residing at Toledo, Lucas county, Ohio, have invented new and useful Multiple-Speed Machine-Tools, of which the following is a specification.

This invention relates to features of driving control and adjustment directly incorporated in machines.

This invention has utility when embodied in machine tools, particularly power actuated boring machines and drill presses.

Referring to the drawings:

Figure 1 is a side elevation, with parts broken away of an embodiment of the invention in a machine tool;

Fig. 2 is a front view of the machine of Fig. 1;

Fig. 3 is a top plan view of the machine of Fig. 1;

Fig. 4 is a detail elevation from the left of Figs. 1 and 3, showing the belt drive connections and control;

Fig. 5 is a side elevation of belt drive connections and control for straight drive as distinguished from the angle drive connections of Figs. 1, 2, 3;

Fig. 6 is a plan view of the shiftable gears of the multiple speed driving mechanism;

Fig. 7 is a side elevation of the multiple speed driving mechanism, shown as adapted to the angle drive;

Fig. 8 is a plan view of the compound table, with parts broken away;

Fig. 9 is a section on the line IX—IX, Fig. 8, looking in the direction of the arrow; and Fig. 10 is a section on the line X—X, Fig. 8, looking in the direction of the arrow.

The driving belt 1 passes over the loose pulley 2 on the shaft 3 mounted in the machine tool frame or housing 4. Near the front of this frame 4 is the shaft 5 on which is loosely mounted the hand lever 6 from which extends the link 7 to the bell crank lever 8 having its opposite arm engage between lugs on the slide bar 9 carrying the belt engaging forks 10. The bar 9 also carries pins 11 spaced apart to allow some freedom of movement therebetween of the arm 12 actuating the brake shoe 13 (Fig. 4). In throwing the belt 1 from the pulley 14 fast on the shaft 3, to the loose pulley 2, the forks 10 carry the belt 1, and as this travel is completed, the brake shoe 13 contacts the pulley 14 to bring this driving pulley 14 to a stop. In the shifting of the belt 1 back to the fast pulley 14, the brake 13 releases the pulley 14 before the belt is brought over. The play between the arm 12 and the bar 9 allows shifting in either direction to start before the brake is brought to travel.

Fast on the shaft 3, remote from the driving pulley 14 is the bevel gear 15 (Fig. 7) in mesh with the bevel gear 16 on the shaft 17, thus making an angle drive for the shaft 17. The shaft 17 carries pairs of fast gears 18, 19; 20, 21; 22, 23 between the bearings 24. The disposal of the bearings 24 having the anti-friction balls 25 therein, is such that under great transmission strains at various points therealong, the shaft 17 may be firmly held for easy running.

The multiple speed connections are conveniently controlled from the front of the machine where is disposed the hand lever 26 on the shaft 5. The upper end of this hand lever 26 has a head 27 movable to engage recesses 28 in the shifting elements 29, 30, 31, as the lever 26 is slid along the shaft 5 for registering relation. The plungers 32 engaging the notches 33 in the shifting elements serve to yieldingly lock the shifting elements in medial disconnected position or in either shift position (Figs. 6, 7). The guide 34 holds the head 27 in actuating engagement with the element 29 when away from central or disconnected position, while the guide ways 35, 36, serve similarly for the elements 30, 31. These guide ways are connected at central or disconnected position of the shifting elements, thus precluding actuation of one element to driving position unless the others are disconnected, as there is but the single hand lever 26 to effect the shifting.

The shifting element 29 carries the fork 37 engaging the pair of shiftable members or gears 38, 39, splined on the shaft 40 parallel with the shaft 17. The gear 38 may be moved into mesh relation with the gear 18 on the shaft 17, while the gear 39 may be moved into mesh relation with the gear 19 on the shaft 17, the latter being for slower speed driving of the follower shaft 40 from the live shaft 17 than through the gears 18, 38.

The shifting element 30 carries the shifting fork 41 engaging the pair of shiftable members or gears 42, 43, splined on the shaft 40 between bearings 24. With the gear 42 moved into mesh relation with the gear 20, the shaft 40 is driven from the shaft 17 at a higher speed than when the gear 43 is in mesh with the gear 21.

The shifting element 31 carries the shifting fork 44 engaging the pair of shiftable members or gears 45, 46, splined on the shaft 40. The gear 45 may mesh with the gear 22 and the gear 46 with the gear 23, to drive the shaft 40 at two still slower speeds from the shaft 17 than the other driving connections, which are higher as they approach the other end of the shaft 40—the gear 38 driving at the highest speed. Accordingly six speeds are conveniently provided in a compact built in structure in such a way but one may be connected up at a time.

The shaft 40 carries the bevel gear 47 in mesh with the bevel gear 48 on the vertical shaft 49 carrying at its upper end the pinion 50 (Fig. 3) in mesh with the gear 51 on the shaft 52. Rotation of the shaft 52 carries with it the holder 53 for the working tool 54.

To hold the work in position for the tool, a compound table is provided. The bracket table section 55 carries the shaft 56 having the bevel gear 57 in mesh with the bevel gear 58 on the screw 59, so that upon rotation of the shaft 56 with a wrench or crank, the bracket 55 may be adjusted up and down the main frame 4 toward and from the working tool 54.

Slidable on the bracket 55 toward and from the frame 4 is the first or lower adjustable table section 60. This section 60 carries shaft 61 having hand wheel 62 thereon. Rotation of the shaft 61, through the spiral gear 63, drives the spiral gear 64 (Fig. 10), carried in the bearing 65 from the frame or section 60. This gear 64 serves as a nut on the screw 66 locked against rotation as to the bracket 55 by the manually shiftable clutch collar 67. Accordingly in rotating the hand wheel 62, adjustment of the table section 60 may be effected in and out from the frame 4 by travel along the screw 66. The angle of friction of the spiral gears is such that any position of adjustment to which shifted is automatically maintained, and even operation of the screw 66 by a wrench or crank may not be transmitted to rotation of the spiral gears, so that adjustment from screw 66 may be directly effected.

Transversely adjustable across the first table section 60 is the second table section 68. The hand wheel 69 mounted on the shaft 70 in the table section 60, carries the spiral gear 71 in mesh with the spiral gear 72 (Fig. 9) mounted in the bracket 73 carried by the section 60. The gear 72 coacts as a nut with the screw 74 having the clutch collars 75. When the screws are rotated, the thrust bearings 76 resist end movement for easier turning.

In operation, the hand levers and hand wheels are all grouped for control by the machine operator from in front of the machine, where the work may be directly under his inspection. The machine may be started by operation of the hand lever 6 to shift the belt to the fast pulley 14. With the hand lever 26, the desired speed for rotation may be selected by such shifting of gears as the particular work may require. Table adjustments for placing and shifting the work are conveniently made from the hand wheels. With the belt shifting hand lever adjacent the gear shifting hand lever, and both disposed conveniently for the operator, full control is possible at all times. To readily effect a change of speed, the belt may be shifted to permit of the machine slowing down, and with the gear shifting lever adjacent, the connecting up of the gears for the desired speed relation is accomplished, the control of the driving belt allowing the machine to be run at such a speed that the gears may be thrown in.

What is claimed and it is desired to secure by Letters Patent is:

1. A machine tool embodying a frame provided with an overhanging portion, a drill spindle carried by said overhanging portion, an actuating shaft for the drill spindle parallel thereto, a pair of shafts carried by said frame and extending away from the actuating shaft, one of said shafts having driving connection with the actuating shaft, variable speed driving connection between the pair of shafts operable to change the speed of the drill spindle, said frame providing a housing for the pair of shafts and the variable speed driving connection therebetween, and a laterally shiftable control handle for the driving connection.

2. A machine tool embodying a frame, a drill spindle carried by said frame, an actuating shaft for the drill spindle parallel thereto, interconnectible gear carrying parallel shafts extending away from the actuating shaft, said frame housing said parallel shafts, one of said shafts connected to the actuating shaft for varying the driving speed of said spindle, and adjacent the drill spindle a laterally shiftable rockable control handle for varying the speed of the spindle.

3. A machine tool embodying a frame, a drill spindle carried by the frame, a pair of shafts carried by said frame and extending away from the drill spindle, one of said shafts having driving connection to actuate the drill spindle, variable speed driving connection between the pair of shafts operable to change the speed of the drill spindle, said frame providing a housing for the variable speed driving connection, and adjacent the drill spindle a laterally shiftable rockable control handle for the driving connection.

4. A machine tool embodying a frame, a drill spindle carried by the frame, interconnectible gear carrying parallel shafts extending away from the drill spindle, one of said shafts being connected for variable speed driving of said drill spindle, said frame providing a housing for the interconnectible gear carrying parallel shafts, and a laterally shiftable rockable control handle for varying the speed of the spindle.

5. A machine tool embodying a frame, a drill spindle carried by the frame, a driving shaft at an angle to the drill spindle, a pair of shafts extending from adjacent the drill spindle toward the driving shaft, driving connection between said shafts, and the spindle, said connection including variable speed gearing between the pair of shafts, said frame providing a housing for the variable speed gearing, and a laterally shiftable control handle for the gearing.

6. A machine tool embodying a frame, a drill spindle carried by the frame, a driving shaft at an angle to the drill spindle, a pair of shafts extending from adjacent the drill spindle toward the driving shaft, one of said shafts having driving connection with the spindle, the other shaft having driving connection with the driving shaft, variable speed gearing between said pair of shafts for varying the speed of the spindle, said frame providing a housing for the gearing, and a laterally shiftable rockable control handle for the gearing.

7. A machine tool including a vertical drill spindle, a horizontal driving shaft spaced therefrom, horizontal shafts connected therebetween, shiftable gears for varying the speed of the spindle, a housing for the gears, and a laterally shiftable rockable control handle for shifting the gears.

In testimony whereof I affix my signature in the presence of two witnesses.

GEO. E. HALLENBECK.

Witnesses:
 GEO. E. KIRK,
 C. H. RAUCH.

Copies of this patent may be obtained for five cents each, by addressing the "Commissioner of Patents, Washington, D. C."